Sept. 20, 1960             E. BERMAN             2,953,454
PHOTOTROPIC DATA STORAGE CAPSULES AND
BASE COATED THEREWITH Filed April 23, 1957             2 Sheets-Sheet 1

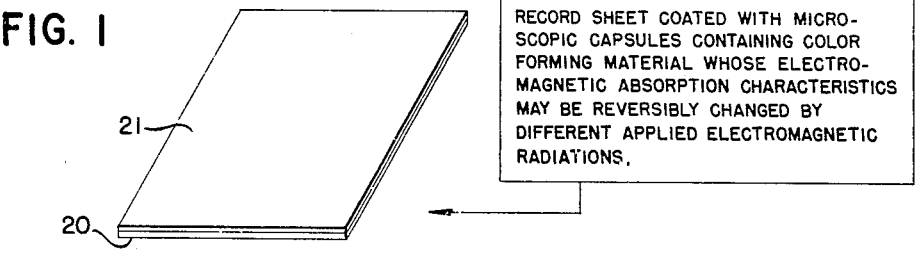

FIG. 1 — RECORD SHEET COATED WITH MICROSCOPIC CAPSULES CONTAINING COLOR FORMING MATERIAL WHOSE ELECTROMAGNETIC ABSORPTION CHARACTERISTICS MAY BE REVERSIBLY CHANGED BY DIFFERENT APPLIED ELECTROMAGNETIC RADIATIONS.

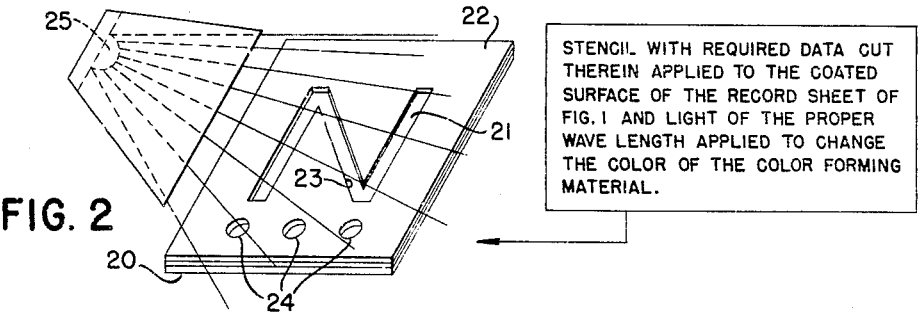

FIG. 2 — STENCIL WITH REQUIRED DATA CUT THEREIN APPLIED TO THE COATED SURFACE OF THE RECORD SHEET OF FIG. 1 AND LIGHT OF THE PROPER WAVE LENGTH APPLIED TO CHANGE THE COLOR OF THE COLOR FORMING MATERIAL.

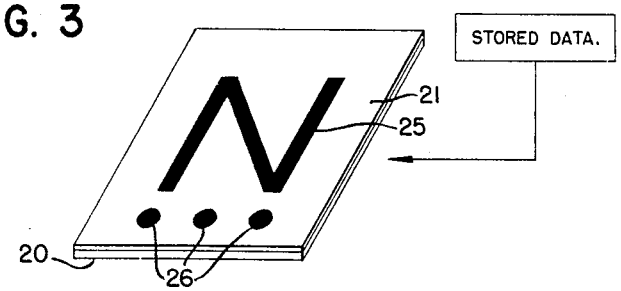

FIG. 3 — STORED DATA.

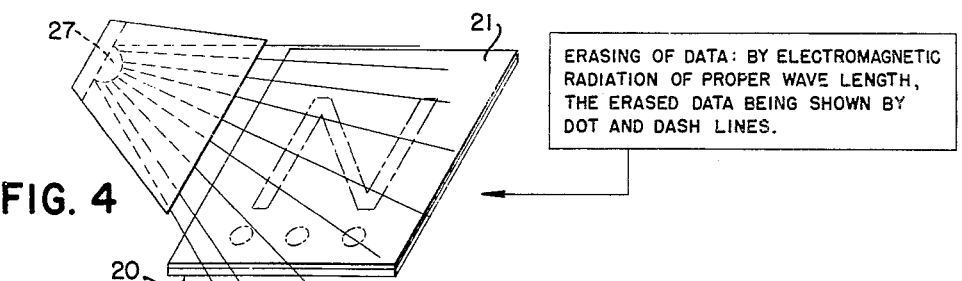

FIG. 4 — ERASING OF DATA: BY ELECTROMAGNETIC RADIATION OF PROPER WAVE LENGTH, THE ERASED DATA BEING SHOWN BY DOT AND DASH LINES.

INVENTOR
ELLIOT BERMAN
BY Louis A. Kline
Justin S. Lompston
HIS ATTORNEYS

Sept. 20, 1960 E. BERMAN 2,953,454
PHOTOTROPIC DATA STORAGE CAPSULES AND
BASE COATED THEREWITH
Filed April 23, 1957 2 Sheets-Sheet 2

INVENTOR
ELLIOT BERMAN

HIS ATTORNEYS

United States Patent Office 2,953,454
Patented Sept. 20, 1960

2,953,454

PHOTOTROPIC DATA STORAGE CAPSULES AND BASE COATED THEREWITH

Elliot Berman, Dayton, Ohio, assignor to The National Cash Register Company, Dayton, Ohio, a corporation of Maryland Filed Apr. 23, 1957, Ser. No. 654,578

6 Claims. (Cl. 96—90)

This invention relates to a data storage device and more particularly pertains to a sheet, web, or other material which may be sensitized with one or more chemical compounds the molecules of which in solution can be changed in their electromagnetic wave absorption characteristics, in controlled desired images or areas, by a certain wave length band of electromagnetic waves applied thereto for a short time and will remain in the changed state under ordinary conditions, but can be reversed, when desired, to return the molecules to the original wave band absorption characteristics by application of another wave band of electromagnetic waves.

This applied electromagnetic radiation may be both in and beyond the visual range. The image formed may be visible or invisible and, if in the visual range, can be sensed by the human eye or by photoelectric devices and, if in the range beyond the visual range, can be sensed by photoelectric devices of various characteristics.

In this specification, the preferred form of the invention will be described with reference to compounds which normally are colorless, or substantially so as applied in solution to a sheet, and which may be changed to a visible colored form by a range of electromagnetic wave lengths, which will be described, and which may be returned, at will, to the colorless form by the application of electromagnetic radiation of other wave lengths.

There are different ways to sensitize a sheet with the compounds. First, in the preferred form, specified herein, a colorless color-forming compound is dissolved in an oil, emulsified in a water solution of a translucent film-forming material, which emulsion is caused to undergo coacervation and to form around each oil droplet a film or capsule of oil-impermeable material, each of the capsules being discrete. The coacervate mixture is coated on the sheet, web, or other material, to dry into a coating which may be exposed to the applied radiation. The method of making such capsules will be described later. In a second form, the color-forming compound may be dissolved in a volatile solvent and mixed with a solution of a film-forming material of transparent nature. The resulting mixture may be formed into a film with the color-forming compound dissolved therein and composing a part of it. Another way to sensitize a sheet is to emulsify an oil solution of the color-forming compound in a sol of a hydrophilic film-forming material which may be coated and dried on the sheet, leaving a film with the dissolved color-forming compound as liquid droplets therein.

The specific embodiment of the invention which is best adapted to convey the idea of a storage system, utilizes a stencil as a mask, which mask is made of material which will not pass the wave lengths of light which cause the color change, the cut-out portions of the stencil allowing an applied electromagnetic radiation to strike the sheet or web according to the desired image or images. Furthermore, the compounds chosen for the preferred embodiment are colorless, or practically so, in one state and change by application of light to a visibly colored form, being stable in either state unless subjected to the electromagnetic wave length which will switch the color absorption of the molecules in the opposite direction.

The stencil used in the preferred embodiment could be replaced by a guided electromagnetic wave beam to accomplish the same purpose.

One very practical use for the novel data storage system is as a binary digital storage device. The sheet may be provided with activatable spots of the desired solution of color-forming compound, which spots, by their location, represent digital data, the colorless and colored states of the spots representing either the value "zero" or the value "one." The spots may be printed as such on the sheet prior to use, or the whole sheet may be sensitized by the compound and the spots determined by holes in a mask which will not pass the required wave lengths of light to change the light absorption of the molecules to the colored form or vice versa, but which wave lengths of light may pass through the spot holes in the stencil.

With these and incidental objects and uses in view, the invention includes various novel features which will become apparent in the specification to follow, which specification will be described with reference to the drawings.

Of the drawings:

Fig. 1 is a perspective view of a base record sheet coated with microscopic capsules each containing an oil droplet in which is dissolved the light-sensitive material in colorless form;

Fig. 2 shows the sheet of Fig. 1 covered by a light-masking stencil depicting a cut-out letter of the alphabet and code spots, and showing the stencil and its openings being subjected to light rays of a wave length band which will turn the light-sensitive material to the colored form;

Fig. 3 represents the sheet of Figs. 1 and 2 with the letter and the spots in colored form after they have been subjected to the light rays in Fig. 2;

Fig. 4 represents the sheet of Fig. 3 after it has been subjected to an erasing band of light waves.

General description

In the following description, the applied electromagnetic radiation, whether in the visible or in the ultra-violet or in the infra-red region of the electromagnetic spectrum, will be referred to as "light" to simplify the explanation. The publication "The International Dictionary of Physics and Electronics," published in 1956 by D. Van Nostrand Company, Incorporated, of Princeton, New Jersey; New York; Toronto; and London, under the definition of the word "light" justifies such use as applied to visible light and to the ultra-violet, infra-red, or X-ray regions of the electromagnetic spectrum.

Figure 5:
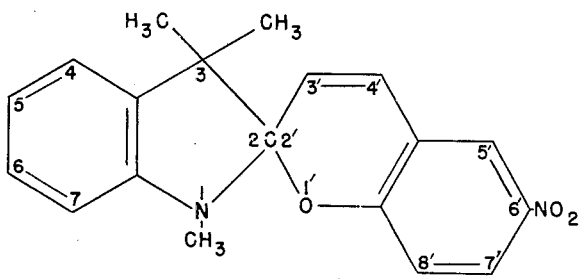
Figs. 5, 6, 7, and 8 are structural formulas of derivatives of 1,3,3-trimethyl-spiro(2'H-1'-benzopyran-2,2'-indoline), which are reversible in their electromagnetic absorption characteristics through application of different wave bands of light.
Figure 6:
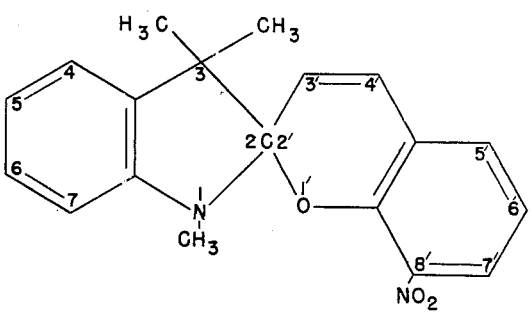
Figure 7:
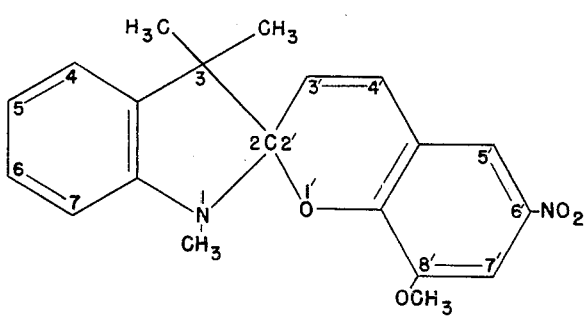
Figure 8:
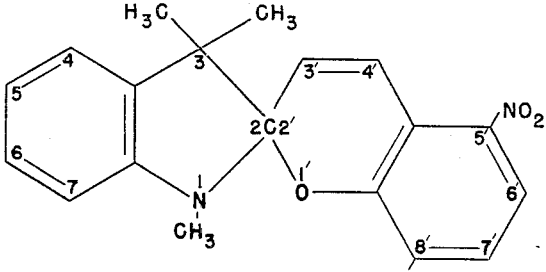

In the preferred embodiment of the invention, the color-reversible light-reactant compounds, compound (I), 1,3,3-trimethyl - 6' - nitro-spiro(2'H-1'-benzopyran-2,2'-indoline), Fig. 5; compound (II), 1,3,3-trimethyl-8'-nitro-spiro(2'H-1'-benzopyran-2,2'-indoline), Fig. 6; compound (III), 1,3,3 - trimethyl-6'-nitro-8'-methoxy-spiro-(2'H-1'-benzopyran-2,2'-indoline), Fig. 7; and compound (IV), 1,3,3 - trimethyl-5'-nitro-8'-methoxy-spiro(2'H-1'-benzopyran-2,2'-indoline), Fig. 8, were chosen because they operate satisfactorily at room temperature, whereas some other compounds reverse at temperatures far above or below room temperature. Room temperature may be considered as approximately 70 degrees Fahrenheit. These compounds are soluble in oil, either synthetic mineral, vegetable, or animal, examples being trichlorodiphenyl, methyl salicylate, cod liver oil, castor oil, olive oil, sperm oil, petroleum fractions such as diethylbenzene, toluene, and ligroin, and the like. The oil used should be substantially colorless and transparent, so as not to hide the color of the color-reversible compound held thereby.

Referring to Fig. 1, a base web sheet 20, such as paper, is coated with microscopic capsules each containing a tiny droplet of oil in which is dissolved a small amount of one or more of the compounds of Figs. 5 to 8. A way of making such microscopic oil-containing capsules is disclosed in United States Patent No. 2,730,457, which issued on the application of Barrett K. Green and Lowell Schleicher on January 10, 1956. For convenience, the necessary parts of that disclosure will be repeated herein.

To form the capsules, 20 grams of gum arabic is dissolved in 160 grams of water, and into this is emulsified 160 grams of trichlorodiphenyl containing about 3%, by weight, of one or more of the colorless dye-stuffs shown in Figs. 5 to 8. The emulsion is carried on until the drop size of the oil is from 2 to 5 microns.

Next, 20 grams of gelatin is dissolved in 160 grams of water and mixed with the emulsion. This gelatin preferably is made from pigskins and has its isoelectric point at approximately pH 8 and a jelly strength of 275 grams, as measured by the Bloom gelometer. The pH of the mixture of colloid sols is adjusted to 6.5 with 20%, by weight, of sodium hydroxide in water. Three hundred grams of the adjusted mixture is diluted to approximately 700 grams with water at 50 degrees centigrade, with agitation. The pH of the diluted mixture is then lowered to approximately 4.5 with 10%, by weight, of acetic acid in water, which causes coacervation resulting in the deposition of the colloid complex evenly and densely around each of the oil droplets individually.

The foregoing solutions are made at 50 degrees centigrade.

While the mixture is still at 50 degrees centigrade, 2.19 grams of the 37% solution, by weight, of formaldehyde in water is added. No more than twenty minutes should elapse from the start of dilution to this point. Thereafter, a gelation step is commenced by placing the mixture in an ice bath, with agitation, until it reaches 10 degrees centigrade. The pH then is adjusted to 9 with 20%, by weight, of sodium hydroxide in water to promote the hardening of the colloid complex. This material may be coated on the paper without any further water adjustment and dried. This coating is indicated by the reference numeral 21 in Figs. 1, 2, 3, and 4.

This is the preferred form of record sheet, in which the capsules hold the oil in position, so that there will be no lateral migration of the color. This coating is applied as a creamy white fluid, but, as it dries, the tacky capsules will adhere to the paper in an invisible translucent film, inasmuch as the color of the molecules of the light-reversible compound has not been developed by light. If the lateral migration of the color is of no concern, the color-reversible compound may be carried dissolved in oil droplets and an emulsion of the oil in gelatin, which is coated on the paper and which, when dried, forms a continuous film, in which the oil droplets are entrapped as microscopic liquid inclusions. Such a film is shown in United States Patent No. 2,374,862, which issued on the application of Barrett K. Green on May 1, 1945.

A typical example of storing data on such a sheet is shown in Fig. 2, wherein a stencil 22 is placed over the sheet, said stencil having cut therein an "N" 23 and holes 24 for the transmission of light through the coating 21, the remainder of the stencil being opaque to the light which issues from a light source 25 of under 4,000 angstrom units. The reaction is without visible delay, and the portions of the coating 21 struck by the light turn to a colored form.

If the compound (I) shown in Fig. 5 is used, the color of the "N" 25 and the dots 26 (Fig. 3) will be dark blue. If the compound (II) shown in Fig. 6 is used, the color will be blue-violet. If the compound (III) shown in Fig. 7 is used, the color will be dark violet, and, if the compound (IV) shown in Fig. 8 is used, the color will be gray-blue.

To erase the data, visible light of another wave length, above 4,000 angstrom units, is directed on the surface 21 from an erasing lamp 27 (Fig. 4), and the surface 21 will revert to the normal white, or colorless, state. The dash-and-dot lines on the surface 21 of Fig. 4 indicate where the images have been, but there is nothing visible of them on the surface 21, as the erasure is complete. This data storage and erasure may be performed time after time in the same area.

Another compound (V) which is useful in the specified system is 1,3,3-trimethyl-6'-chloro-8'-nitro-spiro(2'H-1'-benzopyran-2,2'-indoline), which normally is a pale green compound changeable to dark blue by application of light of a wave band below 4,000 angstrom units, and switchable back by application of a visible wave band of light at room temperature. This compound has a structure like that of Fig. 6 but has, in addition, a chloro substituent at the 6' position.

There are various other compounds known which are reversibly switched by light, but none have been made into a practical data storage device by sensitization of the surface of a sheet or web with discrete droplets of liquid in which the compound or compounds are dissolved.

It is self-evident that, to maintain the stored data, it must not be subjected to wave lengths of light which will switch the sensitizing compound to the other state.

The compounds specified herein may be prepared by the condensation of 2-methylene-1,3,3-trimethylindoline with the requisite salicylaldehyde in ethanol. The 2-methylene-1,3,3-trimethylindoline is commercially available. Some of the salicylaldehyde compounds are commercially available. To make the compound of Fig. 5, the commercially available 5-nitrosalicylaldehyde is employed. To make the 8'-nitro derivative of Fig. 6, salicylaldehyde is nitrated by nitric acid in the presence of acetic acid, resulting in a mixture of 3-nitro-salicylaldehyde and 5-nitro-salicylaldehyde. The 3-nitro fraction is separated by converting both fractions to their sodium salts, and the sodium salt of the 3-nitro fraction is recovered by the difference in solubility, the 3-nitro derivative being soluble in water and the 5-nitro derivative not. In making the compound of Fig. 7, 3-methoxy-salicylaldehyde, which is commercially available, is nitrated by nitric acid in the presence of acetic acid to form 3-methoxy-5-nitro-salicylaldehyde. In making the compound of Fig. 8, the commercially available 3-methoxy-salicylaldehyde is condensed with benzenesulfonyl chloride in an aqueous solution of potassium hydroxide to form the corresponding benzenesulfonate. The benzenesulfonate is nitrated with a mixture of concentrated and fuming nitric acid. The resultant ester of 3-methoxy-6-nitro is formed. This ester is hydrolyzed by being treated with potassium hydroxide in ethanol to yield the 3-methoxy-6-nitro-salicylaldehyde. The 1,3,3-trimethyl-6'-chloro-8'-nitro-spiro(2'H-1'benzopyran-2,2'-indoline), mentioned in the specification but not shown in the drawings, is made by the same condensation method by the use of 3-nitro-5-chlorosalicylaldehyde, which may be prepared by nitration of the commercially available 5-chlorosalicylaldehyde with nitric acid and acetic acid.

What is claimed is:

1. A data storage device consisting of discrete droplets carried by a supporting medium, each droplet including a spiropyran compound having substituents added thereto to weaken the spiro-carbon-to-oxygen bond, which compound has two stable states of light absorption and can be changed from either state to the other, at will, at room temperature by being flashed by light of one wave length to change it from one of said states to the other and by being flashed by light of another wave length to return it to said one of said states, each droplet being capable of representing data according to the state it is in.

2. A data storage device consisting of a supporting member having in desired areas thereon a spiropyran compound having substituents added thereto to weaken the spiro-carbon-to oxygen bond, which compound can be in a substantially colorless state or in a colored state and can be changed from either state to the other, at will, at room temperature by being flashed by light of one wave length to change it from said colorless state to said colored state and by being flashed by light of another wave length to return it to said colorless state, each area being capable of representing data according to whether it is in its colored or colorless state.

3. A data storage device consisting of discrete droplets of liquid carried by a supporting medium, each droplet including a compound taken from the group of compounds consisting of I,1,3,3-trimethyl-6'-nitro-spiro(2'H-1'-benzopyran-2,2'-indoline); II,1,3,3 - trimethyl-8'-nitro-spiro(2'H-1'-benzopyran - 2,2' - indoline); III,1,3,3-trimethyl-6'-nitro-8'-methoxy-spiro(2'H-1'-benzopyran-2,2'-indoline); IV,1,3,3-trimethyl - 5' - nitro-8'-methoxy-spiro-(2'H-1'-benzopyran-2,2'-indoline); and V,1,3,3-trimethyl-6'-chloro-8'-nitro-spiro(2'H-1'-benzopyran-2,2'-indoline), which compound has two stable states of light absorption and can be changed from either state to the other, at will, at room temperature by being flashed by light of one wave length to change it from one of said states to the other and by being flashed by light of another wave length to return it to said one of said states, each droplet being capable of representing data according to the state it is in.

4. A data storage device consisting of a minute liquid-containing capsule having light-translucent walls, said liquid having dissolved therein a substance which is reversibly changeable, at will, from one light absorption state to another, by subjecting the solution to light transmitted through the capsule walls, the substance in solution changing to one of said light absorption states when subjected to light predominating in wave lengths in the blue through ultra-violet region of the light spectrum and changing to the other of said light absorption states when subjected to light predominating in wave lengths in the green through infra-red region of the spectrum, the two light absorption states representing data, and each light absorption state being stable when not provoked by light which predominates in wave lengths tending to change the substance in solution to the other light absorption state, the light absorption substance being taken from the group of compounds consisting of compounds (I), (II), (III), (IV), and (V).

5. A data storage device consisting of a base material coated with a film of material translucent to light including the ultra-violet through infra-red region of the spectrum, said film of material containing a profusion of discrete minute liquid droplets each containing dissolved therein a substance which is reversibly changeable, at will, from one light absorption state to another, by subjecting the solution to light transmitted through the film material, the substance in solution changing to one of said light absorption states when subjected to light predominating in wave lengths in the blue through ultra-violet region of the light spectrum and changing to the other of said light absorption states when subjected to light predominating in wave lengths in the green through infra-red region of the spectrum, the two light absorption states representing data, and each light absorption state being stable as to its light absorption characteristics when not provoked by light which predominates in wave lengths tending to change the substance in solution to the other light absorption state, each droplet representing data according to its light absorption state, the light absorption substance being taken from the group consisting of compounds (I), (II), (III), (IV), and (V).

6. A data storage device consisting of discrete minute droplets of a liquid solution of at least one compound contained dispersed in, and held by, a supporting material translucent to light wave lengths including the ultra-violet through infra-red region of the spectrum, said compounds in solution having bi-stable light absorption characteristics, a change from one light absorption state to the other being brought about by subjecting the droplets to light predominating in blue through ultra-violet wave length components, and the other light absorption state being brought about by subjecting the droplets to light predominating in green through infra-red wave length components, the compounds in solution being spiropyran compounds having substituents added thereto to weaken the spiro-carbon-to-oxygen bond.

References Cited in the file of this patent
UNITED STATES PATENTS

| | | |
|---|---|---|
| 1,762,936 | Seymour | June 10, 1930 |
| 2,233,429 | Ostromislensky | Mar. 4, 1941 |
| 2,322,027 | Jelley | June 15, 1943 |
| 2,335,465 | Vierling | Nov. 30, 1943 |
| 2,676,887 | Chalkley | Apr. 27, 1954 |
| 2,710,274 | Kuehl | June 7, 1955 |
| 2,730,457 | Green | Jan. 10, 1956 |